(12) United States Patent
Nagao et al.

(10) Patent No.: US 6,576,704 B2
(45) Date of Patent: Jun. 10, 2003

(54) METHOD FOR CONTINUOUS TREATMENT OF SAPONIFIED ETHYLENE-VINYL ACETATE COPOLYMER

(75) Inventors: Yoshiharu Nagao, Kurashiki (JP); Youichi Neki, Kurashiki (JP); Masahiko Taniguchi, Kurashiki (JP); Kenji Ninomiya, Kurashiki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/734,216

(22) Filed: Dec. 12, 2000

(65) Prior Publication Data
US 2001/0007004 A1 Jul. 5, 2001

(30) Foreign Application Priority Data
Dec. 14, 1999 (JP) ............................................. 11-354693

(51) Int. Cl.$^7$ ............................. C08F 6/00; C08F 8/12; C08F 218/08
(52) U.S. Cl. ........................... 525/57; 525/61; 525/337; 525/348; 525/366; 524/284; 524/394; 524/405; 524/417
(58) Field of Search ............................ 525/57, 61, 337, 525/348, 366; 524/284, 394, 405, 417

(56) References Cited

U.S. PATENT DOCUMENTS

| | | | | |
|---|---|---|---|---|
| 4,367,305 A | * | 1/1983 | Satoh et al. | ................. 524/295 |
| 2002/0035185 A1 | * | 3/2002 | Kawahara et al. | .......... 524/404 |

FOREIGN PATENT DOCUMENTS

JP   1152307 A1 * 6/1999

* cited by examiner

*Primary Examiner*—Donald R. Wilson
(74) *Attorney, Agent, or Firm*—Armstrong, Westerman & Hattori LLP (57) ABSTRACT

The method of treating a saponified ethylene vinyl acetate copolymer (A) with an acid (B) and/or its salt (C) which comprises feeding a saponified ethylene-vinyl acetate copolymer (A') in which the acid (B) and/or salt (C) has been incorporated in advance to a column reactor from its top, simultaneously feeding an aqueous solution of the acid (B) and/or salt (C) from the bottom of the reactor to thereby effect a countercurrent contact of (A') with the aqueous solution of (B) and/or (C), withdrawing the excess of the aqueous solution of acid (B) and/or salt (C) from the reactor top, and continuously withdrawing the treated saponified ethylene-vinyl acetate copolymer from the reactor bottom.

6 Claims, 1 Drawing Sheet

Fig. 1

METHOD FOR CONTINUOUS TREATMENT OF SAPONIFIED ETHYLENE-VINYL ACETATE COPOLYMER

TECHNICAL FIELD

The present invention relates to a method for continuous treatment of a saponified ethylene-vinyl acetate copolymer (hereinafter sometimes referred to briefly as EVOH). More particularly, the present invention relates to a method for continuous treatment of EVOH by which an EVOH having a good melt-moldability with a reduced variation in characteristics (fluidity, resistance to thermal discoloration, etc.) owing to variations in treating conditions, atmospheric conditions and other factors can be produced continuously and on a steady basis (with good reproducibility).

PRIOR ART

EVOH, in general, excels in transparency, gas barrier properties, aroma retention properties, solvent resistance and oil resistance and, on the strength of those characteristics, has been used broadly in various forms such as films, sheets, and containers inclusive of bottles for the packaging of food, pharmaceuticals, industrial chemicals, agrochemicals, and other products.

Usually, the molding of EVOH is made by the melt-molding technique and various shaped articles inclusive of film, sheet, bottle, cup, tube, pipe, etc. have so far been produced and made available commercially. The melt-moldability is a factor of paramount importance and for the purpose of improving the melt-moldability and heat stability of EVOH, attempts have made to treat EVOH with acetic acid, boric acid or phosphoric acid, or a metal salt thereof. To mention a few specific examples, JP Kokai S59-192564 discloses a process which comprises dispersing EVOH in water, adding boric acid thereto and stirring the mixture; JP Kokai S62-143954 discloses a process comprising stirring an EVOH slurry in an aqueous solution containing acetic acid and calcium phosphate, JP Kokai S64-66262 discloses a process comprising immersing a pelletized EVOH in an aqueous solution containing acetic acid and an acetate salt. The present applicant also proposed a method for continuous treatment of EVOH utilizing a column reactor in JP Kokai H11-152307.

However, in the batch processes described in JP Kokai S59-192564, JP Kokai S62-143954 and JP Kokai S64-66262 referred to above, the characteristics of the treated EVOH tend to depend a great deal on the degree of precision of control over preparation of the aqueous treating solution and conditions of treatment so that a batch-to-batch variation in the treated EVOH is inevitable. For example, the accelerated discoloration of EVOH due to the heat of melt-molding (decreased resistance to thermal discoloration) or the variable melt viscosity (fluidity) leading to a variation in melt-moldability (e.g. fish eyes and other defects in the appearance of shaped articles or changes in torque of the extruder) result in a failure to obtain satisfactory shaped articles. There is, thus, room for improvement. The continuous process described in JP Kokai H11-152307 is superior to the above batch processes in the stabilization of EVOH characteristics but depending on variations in various parameters of continuous treatment (water flow, treatment time, etc.) and atmosphere (change in water temperature owing to change in external atmosphere), there remains chances for variations in the characteristics of the product EVOH. Therefore, a method for attaining EVOH having more consistent characteristics has been needed.

OBJECT AND SUMMARY OF THE INVENTION

The present inventor made intensive investigations in the above-described state of the art and found that when EVOH (A) is treated with an acid (B) and/or a salt thereof (C) by a method which comprises feeding a saponified ethylene-vinyl acetate copolymer (A') in which the acid (B) and/or salt (C) has been incorporated in advance to a column reactor from its top, simultaneously feeding an aqueous solution of the acid (B) and/or salt (C) from the bottom of the reactor to thereby effect a countercurrent contact of (A') with the aqueous solution (B) and/or (C), withdrawing the excess of the aqueous solution of acid (B) and/or salt (C) from the reactor top, and continuously withdrawing the treated saponified ethylene-vinyl acetate copolymer from the reactor bottom, an EVOH having a further improved melt-moldability with reduced variations in characteristics (fluidity, resistance to thermal discoloration) can be obtained steadily and continuously.

In this specification, the EVOH substance is sometimes referred to as EVOH (A) or, briefly, as (A) and EVOH containing (B) and/or (C) is sometimes referred to as EVOH (A') or, briefly, as (A').

LEGEND (1) Feeding a saponified ethylene-vinyl acetate copolymer (A')

(2) Feeding an aqueous solution of acid (B) and/or salt (C)

(3) Withdrawing the aqueous solution of acid (B) and/or salt (C)

(4) Withdrawing the treated saponified ethylene-vinyl acetate copolymer

BEST MODE FOR CARRYING OUT THE INVENTION

The present invention is now described in detail.

The EVOH (A) to be used in the present invention is not particularly restricted but may for example be an EVOH having an ethylene content of 10~70 mole % (preferably 20~60 mole %, particularly 25~50 mole %) and a saponification degree of not less than 90 mole % (preferably not less than 95 mole %, particularly not less than 99 mole %). If the ethylene content is less than 10 mole %, the gas barrier properties of products under high-humidity conditions will be inadequate and the melt-moldability of the EVOH will also be poor. Conversely if the ethylene content is more than 70 mole %, no sufficient gas barrier properties will be obtained. If the degree of saponification is less than 90 mole %, the gas barrier properties, heat stability and moisture resistance of products will not be as good as desired.

Furthermore, EVOH (A) preferably has a melt flow rate (MFR; temperature 210° C., load 2160 g) of 0.1~100 g/10 minute (more preferably 1~50 g/min, especially 2~35 g/10 min). If the melt flow rate is lower than the above range, a high torque may develop within a molding machine to make extrusion difficult. If the above range is exceeded, the mechanical strength of products tends to be insufficient.

The EVOH (A) mentioned above is prepared by hydrolyzing an ethylene-vinyl acetate copolymer. The ethylene-vinyl acetate copolymer can be prepared by any known process such as solution polymerization, suspension polymerization or emulsion polymerization, and the method of hydrolyzing the copolymer so prepared may also be a known method.

Optionally, within the range not interfering with the effect of the invention, other copolymerizable ethylenically unsaturated monomers can be further copolymerized. Among such comonomers are olefins such as propylene, 1-butene, isobutene, etc.; unsaturated acids such as acrylic acid, methacrylic acid, crotonic acid, phthalic acid (anhydride), maleic acid (anhydride), itaconic acid (anhydride), etc., inclusive of salts thereof, and $C_{1-18}$ mono- or dialkyl esters thereof; acrylamides such as acrylamide, N—$C_{1-18}$ alkylacrylamide, N,N-dimethylacrylamide, 2-acrylamidopropanesulfonic acid and its salts, acrylamidopropyldimethylamine and its salts with acids or quaternary salts thereof, methacrylamides such as methacrylamide, N—$C_{1-18}$ alkylmethacrylamide, N,N-dimethylmethacrylamide, 2-methacrylamidopropanesulfonic acid and its salts, methacrylamidopropyldimethylamine and its salts with acids or quaternary salts thereof; N-vinylamides such as N-vinylpyrrolidone, N-vinylformamide, N-vinylacetamide, etc.; vinyl cyanides such as acrylonitrile, methacrylonitrile, etc.; vinyl ethers such as $C_{1-18}$ alkyl vinyl ethers, hydroxyalkyl vinyl ethers, alkoxyalkyl vinyl ethers, etc.; vinyl halides such as vinyl chloride, vinylidene chloride, vinyl fluoride, vinylidene fluoride, vinyl bromide, etc.; vinylsilanes such as trimethoxyvinylsilane etc.; allyl acetate, allyl chloride, allyl alcohol, dimethylallyl alcohol; trimethyl-(3-acrylamido-3-dimethylpropyl)ammonium chloride; and acrylamido-2-methylpropanesulfonic acid; among others. Within the range not contrary to the principles of the present invention, such copolymers may be post-modified by urethanation, acetalization or cyanoethylation, for instance.

The acid (B) for use in treating said EVOH (A) may be an organic acid, such as acetic acid, propionic acid, butyric acid, lauric acid, stearic acid, oleic acid, behenic acid, adipic acid, benzoic acid, citric acid, etc., or an inorganic acid, such as hydrochloric acid, sulfuric acid, sulfurous acid, carbonic acid, phosphoric acid, boric acid, and so on. The preferred are acetic acid, boric acid and phosphoric acid.

The salt (C) includes the alkali metal, alkaline earth metal and transition metal salts of the above mentioned acid (B), and as specific salts of acetic acid, for instance, there can be mentioned sodium acetate, potassium acetate, calcium acetate, magnesium acetate, manganese acetate, copper acetate, cobalt acetate and zinc acetate, among others. The preferred, among these, are sodium acetate, potassium acetate, calcium acetate and magnesium acetate.

As salts of boric acid, there can be mentioned calcium borate, cobalt borate, zinc borate (zinc tetraborate, zinc metaborate, etc.), potassium aluminum borate, ammonium borate (ammonium metaborate, ammonium tetraborate, ammonium pentaborate, ammonium octaborate, etc.), cadmium borate (cadmium orthoborate, cadmium tetraborate, etc.), potassium borate (potassium metaborate, potassium tetraborate, potassium pentaborate, potassium hexaborate, potassium octaborate, etc.), silver borate (silver metaborate, silver tetraborate, etc.), copper borate (cupric borate, copper metaborate, copper tetraborate, etc.), sodium borate (sodium metaborate, sodium diborate, sodium tetraborate, sodium pentaborate, sodium hexaborate, sodium octaborate, etc.), lead borate (lead metaborate, lead hexaborate, etc.), nickel borate (nickel orthoborate, nickel diborate, nickel tetraborate, nickel octaborate, etc.), barium borate (barium orthoborate, barium metaborate, barium diborate, barium tetraborate, etc.), bismuth borate, magnesium borate (magnesium orthoborate, magnesium diborate, magnesium metaborate, trimagnesium tetraborate, pentamagnesium tetraborate, etc.), manganese borate (manganous borate, manganese metaborate, manganese tetraborate, etc.), lithium borate (lithium metaborate, lithium tetraborate, lithium pentaborate, etc.), and borate minerals such as borax, cahnite, inyoite, kotoite, suanite, szaibelyite, etc. The preferred, among these, are borax and sodium borate (sodium metaborate, sodium diborate, sodium tetraborate, sodium pentaborate, sodium hexaborate, sodium octaborate, etc.).

As salts of phosphoric acid, there can be mentioned sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, etc. and, among these, sodium dihydrogen phosphate, potassium dihydrogen phosphate, calcium dihydrogen phosphate and magnesium dihydrogen phosphate are preferred.

Figure 1:
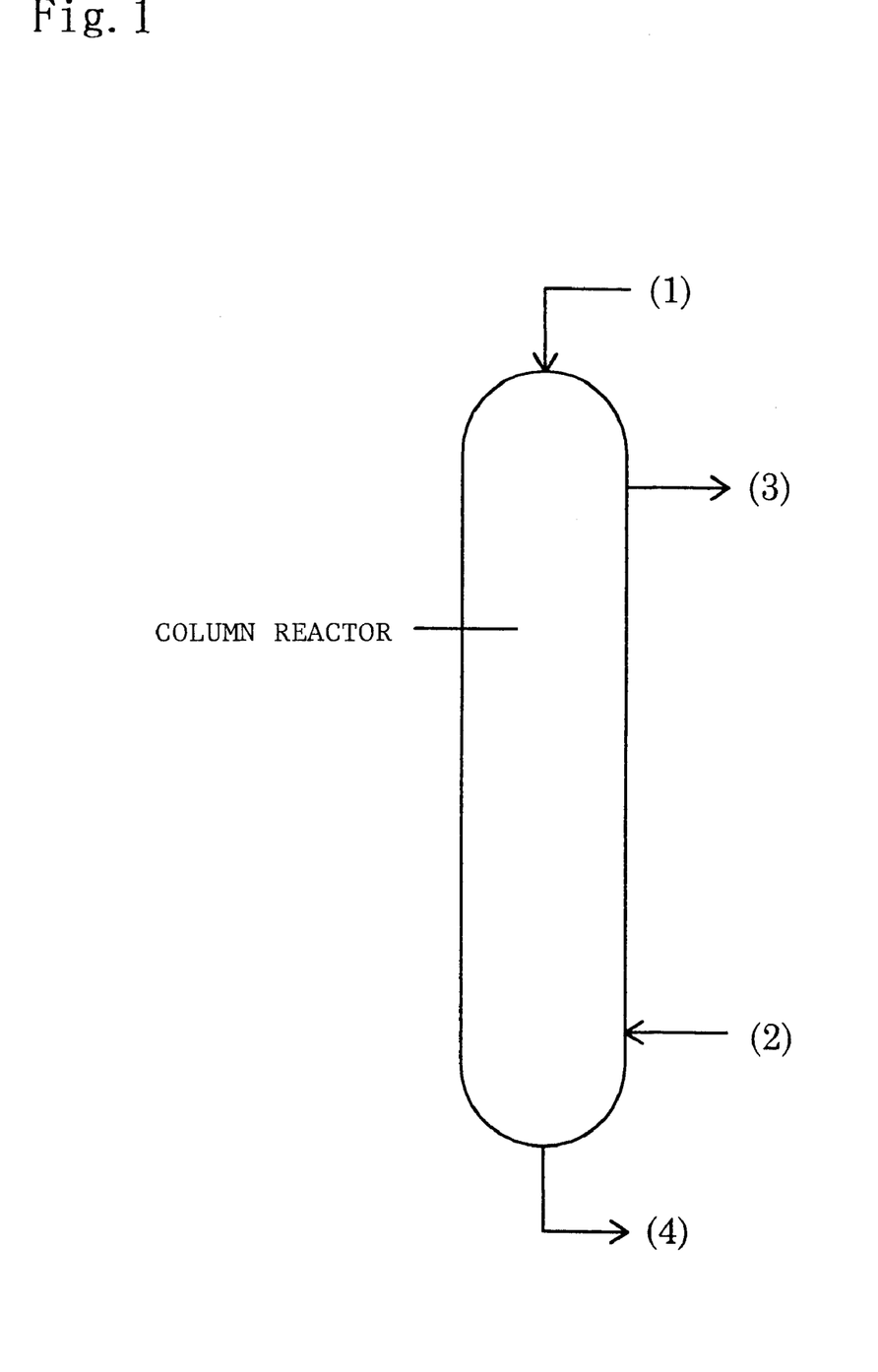
FIG. 1 is a schematic view showing the treating method of the invention.

The most outstanding feature of the present invention is that in treating said EVOH (A) with said acid (B) and/or salt (C), EVOH (A'), i.e. (A) plus acid (B) and/or salt (C), is fed to a column reactor from its top, while an aqueous solution of said (B) and/or salt (C) is fed to the reactor from its bottom so as to bring said EVOH (A') and aqueous solution of (B) and/or (C) into countercurrent contact and while the surplus aqueous solution of acid (B) and/or salt (C) is withdrawn from the reactor top, the saponified ethylene-vinyl acetate copolymer is continuously taken out of the reactor from the column bottom. This method is now described in further detail.

The column reactor for use in the present invention is not particularly restricted but may be of any suitable configuration, such as cylindrical, rectangular parallelepiped, cubic, conical or spherical, or even a combination of such configurations. As a representative one, there can be mentioned a generally cylindrical reactor (tank) with a height/diameter ratio of about 4~12. The reactor is provided with openings in its top, at various strategical levels and at its bottom for the supply or withdrawal of the starting materials and products and is preferably provided with a liquid-temperature control or jacket by which the temperature of the aqueous solution of acid (B) and/or salt (C) in the reactor can be controlled. It may be further provided with a stirrer.

While the EVOH (A') containing the acid (B) and/or salt (C) is fed into the column reactor from its top in accordance with the invention, the method of incorporating the acid (B) and/or salt (C) in EVOH (A) in advance is not particularly restricted. Thus, there can be mentioned (1) the method which comprises contacting a porous precipitate of EVOH (A) having a water content of 20~80 weight % with an aqueous solution of acid (B) and/or salt (C) to thereby incorporate (B) and/or (C) in the EVOH (A), (2) the method which comprises adding the acid (B) and/or salt (C) to a homogeneous solution of EVOH (A) (in water/alcohol), extruding the mixture in a coagulation bath, and cutting the coagulated extrudate into pellets, (3) the method which comprises blending EVOH (A) and acid (B) and/or salt (C) together and melt-kneading the blend by means of an extruder or the like, (4) the method which comprises neutralizing the alkali (e.g. sodium hydroxide or potassium hydroxide) used in the saponification stage of EVOH (A) production with the acid (B), which may for example be acetic acid, and adjusting the amount of the residual acid (B), e.g. acetic acid, and the byproduct alkali metal salt (C)

e.g. sodium acetate or potassium acetate, by washing with water, and (5) the method which comprises adding the acid (B) and/or salt (C) during or after polymerization in the production of the ethylene-vinyl acetate copolymer prior to the saponification stage. In order that the effect of the invention may be more fully expressed, the method (2) is preferred because it provides for better dispersion of (B) and/or (C) and is advantageous for commercial-scale production. Therefore, the method (2) is now described in detail, although this method is not an exclusive choice.

In preparing a solution of EVOH (A), EVOH (A) may be dissolved in any solvent in which it is soluble and there is no limitation on the solvent or the method for dissolving. However, the solvent may for example be selected from among methanol, ethanol, propanol, butanol, phenol, dimethyl sulfoxide (DMSO), hexafluoroisopropyl alcohol (HFIP), etc. and aqueous solutions of such solvents (mixed solvents). For commercial-scale production, it is preferable to use a mixture solvent consisting of water and a lower alcohol (e.g. methanol, ethanol, propanol, butanol, etc.), and in terms of solubility of EVOH (A), the ratio of the organic solvent to water in such a mixture solvent is preferably [solvent/water]=95/5~20/80 (more preferably 90/10~40/60). The amount of EVOH (A) in the solution is preferably 2~60 weight % (more preferably 5~60 weight %, particularly 10~55 weight %). When the level of EVOH (A) is below 2 weight %, it may be found difficult to incorporate a necessary amount of acid (B) and/or salt (C) in the EVOH (A). On the other hand, when the level of EVOH (A) exceeds 60 weight %, (B) and/or (C) may not be uniformly dispersed. The method of preparing such a solution includes, for example, a) the method which comprises dissolving powders or pellets of EVOH (A) not containing (B) and/or (C) in a solvent or a mixture solvent consisting of water and a solvent at a necessary final concentration, b) the method which comprises adding a suitable amount of a solvent, water or a mixture solvent to the solvent solution of EVOH (A) after saponification in the process for production of EVOH (A) and c) the method which comprises dissolving the hydrous EVOH (A) pellets after precipitation or precipitation-washing in the production process in a solvent or a solvent-water mixture at a necessary final concentration. For commercial production, the method b) is preferred.

The acid (B) and/or salt thereof (C) is then incorporated in the thus-prepared EVOH (A) solution. The method for incorporation is not particularly restricted but includes, among others, the method which comprises adding said acid (B) and/or salt (C) directly to said aqueous solution or the method comprising preparing a solution containing about 0.01~20 weight % of said (B) and/or salt (C) in water or a solvent-water mixture and adding the solution.

The level of use of the acid (B) and/or salt (C) in the EVOH (A') solution is preferably 0.001~5 weight parts (more preferably 0.005~1 weight parts) per 100 weight parts of EVOH (A). When the level is below 0.001 weight parts, it may be found difficult to incorporate a necessary amount of (B) and/or (C) in EVOH (A). Conversely, when the level exceeds 5 weight parts, (B) and/or (C) tends to be poorly dispersed. The temperature of the EVOH (A) solution is preferably 10°~100° C. (more preferably 20°~80° C., particularly 30°~70° C.). When the temperature is below 10° C., (B) and/or (C) may not be uniformly dispersed. Over 100° C., the solution will be difficult to handle, thus interfering with efficient production.

The EVOH (A') solution containing (B) and/or (C), thus obtained, is pelletized by extrusion in a coagulation bath. The EVOH (A') solution may be used as prepared but may optionally be concentrated or diluted with water. The concentration of EVOH (A) in the solution is preferably 10~70 weight % (more preferably 15~60 weight %, particularly 20~55 weight %). When the concentration is less than 10 weight %, the solution may not be effectively coagulated in the coagulation bath. Conversely when the concentration exceeds 70 weight %, the solution is too viscous to be easily handled.

In this stage of production, the above solution may be supplemented with various additives, for example a lubricant such as saturated aliphatic amides (e.g. stearylamide), unsaturated fatty acid amides (e.g. oleinamide), bis-fatty acid amides (e.g. ethylenebis stearylamide), fatty acid metal salts (e.g. calcium stearate, magnesium stearate, zinc stearate, etc.), low-molecular-weight polyolefins (e.g. low-molecular-weight polyethylene or a low-molecular-weight polypropylene in the molecular weight range of about 500~10,000), etc., an inorganic salt (e.g. hydrotalcite), a plasticizer (e.g. aliphatic polyhydric alcohols such as ethylene glycol, glycerol, hexanediol, etc.), an oxygen absorber (e.g. reducing ion powder, ascorbic acid), a heat stabilizer, a light stabilizer, an antioxidant (e.g. Irganox 1098, Ciba Specialty Chemicals), an ultraviolet absorber, a colorant, a surfactant, an antifungal agent, a deodorant (e.g. activated carbon), an antiblocking agent (e.g. finely divided talc), a slip agent (e.g. amorphous silica powder), an inorganic filler (e.g. silicon oxide, titanium dioxide, clay, talc, bentonite, water-swellable phyllosilicate) and so on.

The EVOH (A') solution containing said acid (B) and/or salt (C) is extruded in a coagulation bath. As the bath solution, water, a water-alcohol mixture, an aromatic hydrocarbon such as benzene, a ketone such as acetone, methyl ethyl ketone or the like, an ether such as dipropyl ether or the like, and an organic acid ester such as methyl acetate, ethyl acetate, methyl propionate or the like can be used. From the standpoint of ease of handling, the use of water or a mixture of water and an alcohol is preferred. The alcohol may be any of methanol, ethanol, propanol, butanol, etc. but methanol is preferred from industrial points of view.

The temperature at which the EVOH (A') solution is brought into contact with the coagulation bath is preferably –10°~40° C. (more preferably 0°~20° C.) from the standpoint of coagulability of EVOH (A'). The solvents mentioned above for the coagulation bath are nonsolvents for EOVH (A) so that there is no risk for resin loss due to dissolution of EVOH (A') in the coagulation bath but it is preferable to carry out this operation at as low a temperature as possible.

The thus-precipitated (coagulated) EVOH (A') solution containing the acid (B) and/or salt (C) is then pelletized. The pelletization technology that can be used is not particularly restricted but typically includes a) the method which comprises extruding the EVOH (A') solution in a strand form from a nozzle having a suitable geometry into the coagulation bath and cutting the strand to a suitable length, b) the method which comprises extruding the EVOH (A') solution from a die slit having a suitable configuration in the form of a sheet into the coagulation bath, cutting the resulting sheet into a strand having a square sectional configuration and further cutting it into pellets, c) the method which comprises discharging the EVOH (A') solution from a die having small orifices into the coagulation bath, severing the discharged solution with a sharp cutting means (e.g. a cutter) revolving a high speed in contact with the die orifices and completing precipitation while letting the cuttings move with the current of the coagulation bath solution and form pellets. For efficient industrial production, the method a) is preferred.

Therefore, the method a) is described below in detail, although this method is not an exclusive choice.

While the EVOH (A') solution is extruded in a strand form from a nozzle having a suitable geometry into the coagulation bath, the nozzle geometry is not particularly restricted but for productivity points of view, a cylindrical nozzle having a length of preferably 1~100 cm (more preferably 3~30 cm) and an inside diameter of preferably 0.1~10 cm (more preferably 0.2~5.0 cm) can be used with advantage. The strand mentioned above need not necessarily be a single strand, but an arbitrary number, from several to hundreds, of strands can be extruded.

The EVOH extruded in a strand form is cut, after sufficient progress of coagulation, into pellets by a cutting mechanism such as a cutter. From the standpoint of melt-molding workability and handling, the practical pellet size may, in the case of cylindrical pellets, be 1~8 mm in diameter and 1~8 mm in length (preferably 2~5 mm each) or, in the case of spherical pellets, be 1~8 mm in both diameter and length (preferably 1~5 mm each).

Where necessary, the EVOH (A') pellets can be washed with water. The washing can be carried out in a water tank at a temperature of about 10°~60° C. By this washing with water, the levels of oligomers and impurity, solvent and surplus acid (B) and/or salt (C) in the EVOH (A') can be lowered.

In this manner, EVOH (A') pellets containing the acid (B) and/or salt (C) can be obtained. The thus-pelletized EVOH (A') contains not only the acid (B) and/or salt (C) but also the water and solvent used in the upstream treatment, and the preferred EVOH (A) content of the pellet is 20~80 weight % (more preferably 25~65 weight %, particularly 30~60 weight %). When the EVOH (A) content is less than 20 weight %, the variation in the amount of acid (B) and/or salt (C) contained in the EVOH (A') tend to be large. Conversely when the level of 80% is exceeded, the variation in the amount of (B) and/or (C) is similarly increased to cause a disadvantage.

The EVOH (A) content of the pellet as referred to herein means the content determined by the following method.

Method for Content Determination

About 10 g of EVOH pellets are taken on an aluminum foil of known weight (a; unit: g) and the total weight (aluminum foil+EVOH pellets=b; unit: g) is accurately determined. The pellets are then dried for 1 hour using a fan dryer at 170° C. and the total weight (aluminum foil+EVOH pellets=c; unit: g) is accurately determined again. The content is then calculated by means of the following equation.

EVOH content $(\%)=[c-a]/(b-a)]\times 100$

The proper acid (B) and/or salt (C) content of the pellet is dependent on the kind and object of addition and cannot be stated in general terms but taking acetic acid (B) as an example, the preferred content based on 100 weight parts of EVOH (A) is 0.05~5 weight parts (more preferably 0.1~3 weight parts, particularly 0.2~1 weight part). In the case of boric acid (B), the preferred content based on 100 weight parts of EVOH (A) is 0.005~2 weight parts (more preferably 0.01~1 weight part, particularly 0.01~0.5 weight part). Taking phosphoric acid (B) as an example, its content based on 100 weight parts of EVOH (A) is preferably 0.001~1 weight part (more preferably 0.01~0.5 weight part, particularly 0.02~0.3 weight part). In the case of the corresponding metal salts (C), the preferred content of the salt based on 100 weight parts of EVOH (A) is 0.0001~0.1 weight part (more preferably 0.001~0.05 weight part, particularly 0.001~0.03 weight part) in terms of the particular metal. When the acid (B) and/or salt (C) content is less than the above-defined range, it may be found difficult to incorporate a necessary amount of (B) and/or (C) in EVOH (A). Conversely when the content exceeds the above-defined range, the appearance of the end product may be adversely affected.

The EVOH (A') containing said acid (B) and/or salt (C) is then fed into a columnar reactor from its top. The feeding rate of (pelletized) EVOH (A') is preferably about 0.1~5 m$^3$/hr for commercial production. The top of the reactor referred to above means a region from the uppermost end of the column down to about ¼ of the column height, preferably down to ⅛ of the column height.

In addition, an aqueous solution of acid (B) and/or salt (C) is fed from the bottom of the reactor, whereby the pelletized EVOH (A') and the aqueous solution of (B) and/or (C) are brought into countercurrent contact. The feeding amount of said aqueous solution is preferably not less than one part (more preferably 3~20 parts) based on said (pelletized) EVOH (A'). When the ratio is less than 1, the necessary amount of acid (B) and/or salt (C) may not be incorporated or the acid (B) and/or salt (C) content of the treated EVOH (A') tends to be non-uniform. In this connection, a better stability of quality can be expected when the proportion of said aqueous solution of (B) and/or (C) is large but if the (B) and/or (C) content is excessively increased or the ascending flow rate of the aqueous solution is too high, the pellets may become afloat, failing to effect a countercurrent contact. Therefore, it is also good practice to set an upper limit of about 30 parts.

The bottom of the reactor referred to above means the region from the lowest part of the reactor up to about 1/50~⅓ of the reactor height, preferably up to 1/50~1/10.

The flow rate of said aqueous solution of acid (B) and/or salt (C) within the column reactor is preferably 0.005~0.3 m/min (more preferably 0.02~0.4 m/min). When the flow rate is less than 0.005 m/min, a variation tends to take place in the amount of (B) and/or (C) in the EVOH (A'). On the other hand, when the flow rate exceeds 0.3 m/min, the (pelletized) EVOH (A') tends to float up and, in this case, too, a variation tends to occur in the (B) and/or (C) content.

The concentration of said aqueous solution of (B) and/or (C) is dependent on the kind and intended level thereof and cannot be specified in general terms. However, taking acetic acid (B) as an example, the preferred concentration is 0.001~1 weight % (more preferably 0.005~0.5 weight %, particularly 0.01~0.3 weight %). In the case of boric acid (B), its concentration is preferably 0.0001~0.5 weight % (more preferably 0.0005~0.1 weight %, particularly 0.001~0.02 weight %). In the case of phosphoric acid (B), its concentration is preferably 0.0001~0.5 weight % (more preferably 0.0005~0.1 weight %, particularly 0.001~0.05 weight %). When the metal salt (C) is used, the concentration in terms of the particular metal is preferably 0.0001~0.1 weight % (more preferably 0.0002~0.05 weight %, particularly 0.0005~0.03 weight %). When the concentration of the aqueous solution of (B) and/or (C) is less than the above-defined range, a variation tends to occur in the amount of (B) and/or (C) in the EVOH (A'). When the concentration exceeds the above-defined range, a variation also takes place in the amount of (B) and/or (C) in EVOH (A').

In the above treatment, the surplus aqueous solution of acid (B) and/or salt (C) must be removed from the reactor top. The withdrawal rate can be adjusted according to the feeding amounts of (A') and (B) and/or (C) and the desired (B) and (C) content. The reactor top means a region from the topmost position of the reactor down to 1/50~1/3 of the column height, preferably 1/50~1/10 of the column height.

The internal temperature of the reactor is preferably controlled during treatment. Preferably, the temperature within the reactor and the temperature of the aqueous solution of (B) and/or (C) to be fed are controlled at 10°~70° C. (more preferably 15°~60° C., particularly 20°~40° C.). When the temperatures are below 10° C., a variation tends to take place in the concentration of (B) and/or (C) in EVOH (A'). When the limit of 70° C. is exceeded, a variation similarly takes place in the concentration of (B) and/or (C) in EVOH (A').

The residence time of EVOH (A') in the reactor can be judiciously selected from the range of about 1~10 hours.

Water may be supplied at an intermediate level of the reactor, preferably at the level corresponding to 1/3~1/2 of the reactor height from its bottom, particularly 3/5~1/2 from the bottom. The feeding amount of water is preferably 1.0~25 parts based on said EVOH (A'). When the amount is less than 1.0 part, the impurities, if present in EVOH (A), will not be easily removed and the acid (B) and/or salt (C) may not be effectively incorporated in EVOH (A'). Conversely when the amount of water exceeds 25 parts, the water requirements are too large and the EVOH (A) load that can be treated is drastically reduced to cause an economic disadvantage.

The water to be used in this procedure is preferably water containing little metal ions (e.g. deionized water).

The thus-treated (pelletized) EVOH (A') is continuously withdrawn from the bottom of the reactor and, then, dried. The bottom of the reactor in this context means any level within the range from the lowest part of the column up to 1/10 of the column height, preferably up to 1/20 of the column height.

The drying method is not particularly restricted but includes 1) the method comprising contacting the pellets with a hot air current, 2) the melt-kneading method using an extruder or the like, 3) the irradiation method using a microwave, and 4) the induction heating method. In consideration of the quality of dried EVOH (A') and feasibility on a commercial scale, the methods 1) and 2) are preferred. The methods 1) and 2) are described below in detail, although these are not exclusive choices. Furthermore, a procedure may be interposed for removal of the surface water from the (pelletized) EVOH (A').

In the method 1), the EVOH (A') treated in accordance with the invention is exposed to a hot air current for drying. The method and conditions of drying are not particularly restricted but a variety of drying systems can be employed. However, since the method comprising fluidized drying and subsequent stationary drying is particularly preferred, this method is now described in detail.

The fluidized drying as the term is used herein means drying under the agitation caused either mechanically or by means of a hot air current, and as the dryer for use, there can be mentioned a drum/trough dryer, a cylindrical dryer, a rotary dryer, a fluidized-bed dryer, a vibrating fluidized-bed dryer, a rotating cone dryer and so on. The stationary drying as the term is used herein means drying of EVOH (A') in the substantial absence of any dynamic force, e.g. stirring or dispersing, and as the dryer for this type of drying, there can be mentioned a batch box dryer, which is among dryers in which the drying load is held stationary, and a band dryer, a tunnel dryer, and a vertical dryer, which are among dryers in which the drying load is traversed. However, these are not exclusive choices.

The heating gas for use in fluidized drying is either air or an inert gas (e.g. nitrogen gas, helium gas or argon gas). The gas temperature can be judiciously selected from the range of 40°~150° C. according to the volatile content of EVOH (A'). However, in consideration of the fusibility of EVOH (A') at high temperature, the range of 40°~100° C. (preferably 40°~90° C.) can be recommended.

The velocity of heating gas within the dryer is preferably controlled at 0.7~10 m/sec. (more preferably 0.7~5.0 m/sec., particularly 1.0~3.0 m/sec.). When the flow rate of the gas is below 0.7 m/sec., the EVOH (A') tends to undergo fusion. On the other hand, when the flow rate exceeds 10 m/sec, pellet chipping and dust formation are liable to take place.

The fluidized drying time is dependent on the size of EVOH (A') load but, generally speaking, may preferably range from 5 minutes to 36 hours (more preferably 10 minutes~24 hours).

The volatile fraction of EVOH (A') after the above fluidized drying is preferably controlled within the range of 5~60 weight % (more preferably 10~50 weight %).

When the volatile fraction exceeds 60 weight %, the EVOH (A') tends to undergo fusion in the subsequent stationary drying. Reducing the volatile fraction to 5% or less is also objectionable, for the energy loss will then be remarkable for profitable industrial production.

In the fluidized drying step, it is preferable to reduce the volatile fraction by not less than 5 weight % (more preferably 10~45 weight %) from the level prior to drying. When the decrease in volatile fraction is less than 5 weight %, the melt-molding of the resulting EVOH (A') tends to give objectionable fine fish-eyes.

The volatile fraction of EVOH (A') as referred to in this specification is found by the following measurement and calculation (The same applies hereinafter).

Method for Determination of the Volatile Fraction

A sample of EVOH (A') is weighed using an electronic balance (W1; unit: g) and placed in a hot-air oven dryer maintained at 150° C. After 5 hours of this oven drying and 30 minutes of spontaneous cooling in a desiccator, the sample is weighed again in the same manner (W2; unit: g). The volatile fraction is then calculated by means of the following equation.

$$\text{Volatile fraction (weight \%)} = \{(W1-W2)/W1\} \times 100$$

The EVOH (A') thus dehydrated by fluidized drying is further subjected to stationary drying. The heating gas for this stationary drying may also be an inert gas (e.g. nitrogen gas, helium gas or argon gas) but the gas temperature is preferably not below 75° C. (more preferably 85°~150° C.). When the temperature is below 75° C., the drying time setting must be too long for profitable commercial operation.

The gas velocity within the dryer is preferably not more than 1 m/sec (more preferably 0.01~0.5 m/sec.). When the velocity exceeds 1 m/sec., the EVOH can hardly be held stationary.

The stationary drying time cannot be stated in general terms because it depends on the amount of EVOH (A') to be treated but usually may preferably be 10 minutes to 72 hours (more preferably 1~48 hours).

In the method 2), the EVOH (A') which has undergone the treatment of the invention is melt-kneaded with an extruder or the like. The method and conditions of melt-kneading are not particularly restricted but a variety of drying systems can be employed. For example, this operation can be carried out using a known melt-kneading equipment such as a melt-extruder, a kneader-extruder, a mixing roll, a Banbury mixer, a Plastomill or the like. For industrial production, it is generally preferable to use a single-screw extruder or a twin-screw extruder, particularly a twin-screw extruder in view of the stability of melt-kneading. Therefore, the method using a twin-screw extruder is now described in further detail.

The twin-screw extruder which can be used is not particularly restricted but is preferably one having an inside diameter of not less than 20 mm (more preferably 30~150 mm). When the inside diameter is less than 20 mm, the productivity will not be acceptably high. The preferred L/D value is 20~80 (more preferably 30~60). When the L/D ratio is smaller than 20, the drying power may be insufficient. Conversely when the ratio exceeds 80, the residence time of EVOH (A') in the extruder is too protracted so that the risk for thermal degradation is increased. The vent is preferably provided in at least one location, preferably in at least 2 locations, and at least one of them is preferably subjected to vacuum suction from the standpoint of drying efficiency and the quality of EVOH (A') which can be obtained. The die orifice configuration is not particularly restricted but in consideration of the appropriate shape and size of pellets, is preferably circular with a diameter of 1~7 mm (more preferably 2~5 mm). For productivity points of view, the number of orifices is preferably 3~100 (more preferably 10~50).

It is also preferable to interpose one or more (preferably 2 or more) mesh-screens between the extruder and the die inlet for removal of foreign matter and stabilization of resin pressure (stable extrusion). Moreover, in consideration of extrusion stability, a gear pump and a heat exchanger are also preferably provided.

In carrying out the melt-kneading, though not mandatory, the ratio of the cylinder temperature at the exit of the extruder ($T_O$; unit: °C.) to the cylinder temperature at the hopper inlet of the extruder ($T_I$; unit: °C.) is preferably controlled at ($T_O/T_I$)=1.1~10 (more preferably 1.5~8, particularly 1.8~5). If the $T_O/T_I$ ratio is smaller than 1.1, the drying capacity tends to be insufficient or the extrusion may become unsteady. Conversely if the ratio exceeds 10, the quality of EVOH may be decreased (thermal degradation) or the extrusion tends to become unstable. The cylinder temperature mentioned above is the measured temperature of the cylinder.

The heating of the extruder cylinder is usually effected by installation of a plurality of heaters. Taking the case of 8 divisions as an example, the cylinder is fitted with 8 heaters capable of independent temperature control as arranged from the hopper inlet (resin supply) to the extruder exit (resin discharge, die-coupling part). When these heaters are designated as C1, C2, C3 . . . C7 and C8 in the above order, C1 corresponds to said cylinder temperature at hopper inlet and C8 corresponds to said cylinder temperature at extruder exit.

Furthermore, it is particularly preferable that the ratio of the temperature of the metering zone ($T_M$; unit: °C.) to the temperature of the feeding zone ($T_F$; unit: °C.) of the extruder be set at $T_M/T_F$=1.1~10 (more preferably 1.2~9, particularly 1.3~8). If the ($T_M/T_F$) ratio is smaller than 1.1, the drying capacity tends to be insufficient or the extrusion may become unsteady. Conversely if the ratio exceeds 10, the quality of EVOH (A') will be decreased (due to thermal degradation) or the extrusion will become unstable.

The feeding zone mentioned above means a zone corresponding to one-third of the cylinder barrel, when it is divided in 3 equal lengths, as measured from the hopper inlet side, and the metering zone means a zone corresponding to one-third from the extruder exit. The temperature of the feeding zone ($T_F$) means the average cylinder temperature reading in the former-mentioned one-third zone and the temperature of the metering zone ($T_M$) means the average cylinder temperature reading in the latter-mentioned one-third zone.

While the cylinder temperature, the temperature of said feeding zone and the temperature of said metering zone should be controlled as mentioned above, usually these temperatures are preferably selected from the range of room temperature to 300° C. (more preferably 50°~280° C.).

Under the above temperature settings, the molten EVOH (A') is fed and extruded from the die. The extrusion conditions (temperature settings, screw geometry, screw rpm, etc.) are preferably so selected that the temperature of EVOH (A') (resin temperatures) within the die will be 150°~300° C. (more preferably 180°~280° C.). When the resin temperature in the die is less than 150° C., the extrusion tends to become unstable. Conversely when the temperature exceeds 300° C., the quality of EVOH tends to be adversely affected (thermal degradation).

The rotational speed (rpm) of the screw is selected from the range of 50~1000 rpm (preferably 80~700 rpm). When the speed is less than 50 rpm, the drying power tends to be insufficient. Conversely when the speed exceeds 1000 rpm, EVOH (A') tends to be degraded (thermal degradation). The feeding rate of EVOH (A') can be selected with reference to the extruder specifications and the residence time of EVOH (A') in the extruder is selected from the range of 10~600 seconds (more preferably 10~18 seconds). When the residence time is less than 10 seconds, no sufficient drying may be achieved. Conversely when the residence time exceeds 600 seconds, the EVOH (A') tends to be degraded (thermal degradation). The pressure to be applied on EVOH (A') (resin pressure) can be selected from the range of 5~300 kg/cm$^2$ (more preferably 10~200 kg/cm$^2$). When the pressure is lower than 5 kg/cm$^2$ or higher than 300 kg/cm$^2$, the extrusion tends to become unstable. For the prevention of thermal degradation of EVOH (A'), it is also good practice to provide a nitrogen seal within the hopper and around the vents.

The volatile fraction of thus-dried EVOH (A') is preferably controlled within 2 weight % (more preferably not more than 1 weight %, particularly not more than 0.5 weight %) in order that foaming and other troubles during melt-molding (extrusion molding, injection molding, etc.) may be suppressed.

The acid (B) and/or salt (C) content of the dried EVOH (A') is not particularly restricted and cannot be stated in general terms, either. However, in the case of acetic acid (B), its amount based on 100 weight parts of EVOH (A) is preferably 0~1.0 weight part (more preferably 0.001~0.5 weight part, particularly 0.005~0.3 weight part). In the case of boric acid (B), the preferred amount based on 100 weight parts of EVOH (A) is 0.005~2 weight parts (more preferably 0.01~1 weight part, particularly 0.01~0.5 weight part). In the case of phosphoric acid (B), the preferred amount based on 100 weight parts of EVOH (A) is 0.001~1 weight part (more preferably 0.01~0.5 weight part, particularly 0.02~0.3 weight part). When a salt (C) is used, the preferred amount in terms of the metal, based on 100 weight of EVOH (A), is 0.0001~0.1 weight part (more preferably 0.001~0.05 weight part, particularly 0.001~0.03 weight part). When the acid (B) and/or salt (C) content is below the above-defined range (exclusive of acetic acid), the effect of incorporation is poor. Conversely, when the content exceeds the above-defined range, the appearance of shaped articles tends to be adversely affected.

Where necessary, the above EVOH (A') may be supplemented with the above-mentioned additives (said lubricant, inorganic salt, plasticizer, oxygen absorber, heat stabilizer, light stabilizer, antioxidant, UV absorber, colorant, surfactant, antifungal agent, deodorant, antiblocking agent, slip agent, inorganic filler, etc.) and other resins (e.g. polyolefin resin, polyamide resin, polyester resin, etc.). Particularly, anti-gelling agents such as hydrotalcite compounds, heat stabilizers such as hindered phenol or hindered amine compounds, and metal salts of higher aliphatic carboxylic acids can be added.

As the EVOH (A), 2 or more different kinds of EVOH can be used. The use of a blend of EVOHs varying at least 5 mole % in ethylene content and/or at least 1 mole % in the degree of saponification can be used with advantage because the flexibility, thermal moldability (stretchability at a high graft ratio, secondary processability in vacuum pressure molding, deep drawing, etc.), and film-forming stability can be improved without affecting the gas barrier performance. The method for preparing two or more different grades of EVOH is not particularly restricted but includes, among others, the method comprising blending dissimilar EVA pastes prior to saponification and subjecting the blend to saponification, the method comprising mixing EVOH solutions after saponification in alcohol or an alcohol-water solvent and pelletizing the mixture, and the method comprising blending the respective EVOH pellets and melt-kneading the mixture.

The EVOH (A') obtained by the treating method of the invention finds application in a diversity of shaped articles; it can be melt-molded into pellets, films, sheets, containers, fibers, bars, piping and various other shaped articles. Moreover, such articles (to be reclaimed, for instance) can be ground and the regrind be pelletized and subjected to melt-molding.

For melt-molding, the extrusion molding method (T-die extrusion, inflation molding, blow molding, melt-spinning, pipe extrusion, contour extrusion, etc.) or the injection molding method is chiefly used. The melt-molding temperature is often selected from the range of 150°~300° C.

The EVOH (A') can also be used broadly in the manufacture of laminates. Particularly, this EVOH (A') is used by laminating a thermosetting resin layer to at least one side of a layer comprised of this EVOH (A').

In the manufacture of such a laminate, a different material is laminated to one side or either side of the layer comprised of the EVOH (A') treated according to the present invention. The laminating method includes, among others, the method comprising melt-extruding a thermoplastic resin onto a film or sheet of the EVOH (A'), the method conversely comprising melt-extruding the EVOH (A') onto a substrate made of a thermoplastic resin or the like, the method which comprises co-extruding the EVOH (A') and a thermoplastic resin, and the method comprising dry-laminating a film or sheet of the EVOH (A') to a substrate film or sheet with a known adhesive, i.e. an adhesive based on an organotitanium compound, an isocyanate compound, a polyester compound, a polyurethane compound or the like.

The counterpart resin to be used for co-extrusion includes polyolefin resins in the broad sense of the term, such as linear low-density polyethylene, low-density polyethylene, ultra-low-density polyethylene, medium-density polyethylene, high-density polyethylene, ethylene-vinyl acetate copolymer, partially hydrolyzed ethylene-vinyl acetate copolymer, ionomers, ethylene-propylene (block or random) copolymer, ethylene-acrylic acid copolymer, ethylene-acrylate copolymer, ethylene-methacrylic acid copolymer, ethylene-methacrylate copolymer, polypropylene, propylene-$\alpha$-olefin ($C_{4\text{-}20}$ $\alpha$-olefin) copolymer, olefin homo- or copolymers such as polybutene, polypentene, polymethylpentene, etc., and modified homo- or copolymers of such olefins as graft-modified with a unsaturated carboxylic acid or an ester thereof; polyester resin, polyamide resin (inclusive of copolymerized polyamides), polyvinyl chloride, polyvinylidene chloride, acrylic resin, polystyrene resin, vinyl ester resin, polyester elastomer, polyurethane elastomer, chlorinated polyethylene, chlorinated polypropylene, aromatic or aliphatic polyketones, polyalcohols available on reduction thereof, and other grades of EVOH. Among these, from the practical standpoint of the ease of co-extrusion for sheet forming and the physical properties (strength in particular) of the film or sheet, polypropylene, polyamide resin, polyethylene, ethylene-vinyl acetate copolymer, polystyrene resin, polyethylene terephthalate (PET) and polyethylene naphthalate are used with particular advantage.

When the EVOH (A') treated by the method of the invention is first formed into a film or sheet and a different material is extruded or coated thereon or a different film or sheet is laminated thereto, any other arbitrary material (e.g. paper, nonwoven cloth, metal foils, uni- or biaxially stretched plastic films or sheets, vapor-deposited metal or other inorganic layers, woven cloth, metal flocs, wood, etc.) can also be employed.

The laminar structure of laminates may be variegated. Thus, with a layer comprised of the EVOH (A') treated by the method of the invention being represented by a ($a_1$, $a_2$, . . . ) and a layer comprised of a different material, e.g. a thermosetting resin, being represented by b ($b_1$, $b_2$ . . . ), a laminate film, sheet or bottle, for instance, can be provided not only in the bi-metal type structure of a/b but also in such various combinations as b/a/b, a/b/a, $a_1/a_2$/b, $a/b_1/b_2$, $b_2/b_1/a/b_1/b_2$, and $b_2/b_1/a/b_1/a/b_1/b_2$, among others. Furthermore, with a regrind layer comprised of at least an EVOH (A')-thermoplastic resin mixture being represented by R, such combinations as b/R/a, b/R/a/b, b/R/a/R/b, b/a/R/a/b, and b/R/a/R/a/R/b, among others, are feasible. When the laminate is a filament, not only the a/b bi-metal type structure but also the core (a)-sheath (b) structure, the core (b)-sheath (a) structure, and offset (eccentric) core-sheath structure can be selectively used.

In the above laminar structure, there may be interposed an inter-level adhesive resin layer or layers, if necessary, to give a laminate improved in inter-level adhesion and stretchability. Such adhesive resins cannot be specified in general terms, for they are dependent on the kind of resin b but carboxyl-containing modified olefinic polymers obtainable by addition polymerization, graft polymerization or other chemical binding of an unsaturated carboxylic acid or an anhydride thereof to olefinic polymers (said polyolefin resins in the broad sense) can be mentioned as examples. Specifically, one or more polymers selected from among maleic anhydride graft-modified polyethylene, maleic anhydride graft-modified polypropylene, maleic anhydride graft-modified ethylene-propylene (block or random) copolymer, maleic anhydride graft-modified ethylene-ethyl acrylate copolymer, maleic anhydride graft-modified ethylene-vinyl acetate copolymer, etc. can be mentioned as preferred examples. The proportion of the unsaturated carboxylic acid or anhydride thereof in the thermosetting resin is preferably 0.001~3 weight %, more preferably 0.01~1 weight %, still more preferably 0.03~0.5 weight %. When the degree of modification of such a modified resin is too low, the adhesivity tends to be insufficient. When it is too large, a crosslinking reaction may be induced to cause poor moldability. If desired, these adhesive resins may be blended with the EVOH (A') of the present invention, rubber or elastomer components such as polyisobutylene, ethylene-propylene rubber, etc. and even said resin b. Particularly, blending a polyolefin resin different from the polyolefin resin constituting the basis of the adhesive resin is useful for improved adhesion.

The thickness of each layer constituting a laminate is dependent on the laminar structure, kind of resin b, end use and morphology of end product, and required physical properties, among other factors, and cannot be stated in general terms. Usually, however, the thickness of layer a is selected from the range of about 5~500 μm (preferably 10~200 μm), the thickness of layer b from the range of about 10~5000 μm (preferably 30~1000 μm), and the thickness of the adhesive resin layer from the range of about 5~400 μm (preferably 10~150 μm). If the thickness of layer a is less than 5 μm, the gas barrier properties will be insufficient and difficulties will be encountered in thickness control. Conversely if the thickness exceeds 500 μm, the impact resistance will be poor and, in addition, an economic disadvantage will be inevitable. If the thickness of layer b is less than 10 μm, no sufficient rigidity may be obtained. Conversely, if it exceeds 5000 μm, the weight will be increased and an economic disadvantage be inevitable. If the thickness of the adhesive resin layer is less than 5 μm, the inter-level adhesion will be poor and the thickness control will be unstable. Conversely if the thickness exceeds 400 μm, the weight will be unduly increased and an economic disadvantage be inevitable.

The laminate can be applied to various shaped articles and in order to improve physical properties or fabricate various containers or the like, it is good practice to subject the laminate to thermal stretching. The thermal stretching as the term is used herein means any operation in which a uniformly heated laminate film, sheet or parison is molded by means of a chuck, plug, vacuum, pressure, blowing or the like uniformly into shaped articles such as cups, trays, tubes, bottles, or films. The stretching may be uniaxial or biaxial, and the higher the draft ratio is, the more satisfactory are the physical properties of the articles. Thus, stretched articles with good barrier properties and free from pinholes, cracks, eneven stretching, thickness variation, delamination and other defects can be obtained.

As regards the stretching method, one conducive to as high a draft ratio as possible can be selected from among roll stretching, tenter stretching, tubular stretching, stretch-blowing, vacuum forming, pressure molding, vacuum pressure molding, and other methods. In the case of biaxial stretching, whichever of concurrent biaxial stretching and sequential biaxial stretching can be employed. The stretching temperature can be selected from the range of about 60°~170° C., preferably about 80°~160° C.

After completion of stretching, heat setting is preferably carried out. The heat setting can be made by various well-known techniques, and while the stretched film is kept taut, it is subjected to a heat treatment at 80°~170° C., preferably 100°~160° C., for about 2~600 seconds.

When the film is used for the shrink-packaging of raw meat, processed meat, cheese, etc., the heat setting after stretching is not performed to provide a product film and, after placement of the raw meat, processed meat or cheese on the film, the film is heat-shrunken into intimate contact with the food at a temperature of 50°~130° C., preferably 70°~120° C., for 2~300 seconds.

The laminate may assume a variety of forms such as film, sheet, tape, a cup, a tray, a tube, a bottle, a tank, a pipe, filaments and contour extrudates, among other products. Where necessary, the laminate may be subjected to heat treatment, chilling treatment, rolling, printing, dry lamination, solution or melt coating, bag making, deep drawing, box making, tube making, splitting and other processings.

Containers such as cups, trays, tubes, bottles, etc., film bags, coverings, etc. as fabricated in the above manner are useful for packaging food in general, beverages, cosmetic products, pharmaceutical preparations, detergents, aromatic products, industrial products, agrochemicals, fuels and so on.

EXAMPLES

The following examples are further illustrative of the present invention.

In the examples, all parts and % are by weight unless otherwise specified.

It should also be understood that the quantitative analysis for acetic acid was made by extracting EVOH (A') with hot water and subjecting the solution to neutralization titration with an alkali. The quantitative analysis for boric acid was made by dissolving EVOH (A') with an alkali and measuring the boron content by ICP emission spectrometry. The analysis for phosphoric acid was made by decomposing EVOH (A') with nitric acid and sulfuric acid under heating and quantitating phosphate radicals by absorption spectrophotometry. The quantitative analysis for alkali (alkaline earth) metal salt was made by calcifying EVOH (A'), dissolving it in an aqueous solution of hydrogen chloride and assaying the alkali (alkaline earth) metal by atomic absorption spectrometry.

Example 1

To 100 parts of a methanolic solution containing 50% of an ethylene-vinyl copolymer with an ethylene content of 35 mole % was supplied a methanolic solution containing 0.017 equivalent, based on the acetate groups of the copolymer, of sodium hydroxide as well as 150 parts of methanol. Then, 60 parts of an aqueous solution of methanol prepared by blending methanol with water in a ratio of 100:50 parts was supplied at a temperature below the azeotropic temperature. The reaction temperature was 128°~140° C. and the pressure was 5 kg/cm$^3$G. The resulting EVOH (A) solution (resin concentration 40%) was a completely transparent homogeneous solution and the degree of saponification of the vinyl acetate component of EVOH (A) was 99.8 mole %.

To 100 parts of the above EVOH (A) solution (EVOH concentration 40%) was added 4 parts of a 1% aqueous solution of boric acid (B), and the mixture was stirred at 60° C. for 30 minutes to prepare a boric acid (B)-containing EVOH (A') solution (0.1 part of boric acid based on 100 parts of EVOH).

Then, this solution was extruded in a strand form from a cylindrical nozzle having an inside diameter of 0.4 cm and a length of 6 cm into a coagulation bath (water/methanol= 95/5 (by weight)) at 5° C. for coagulation and the strand was cut with a cutter to give EVOH (A') pellets (pellet morphology: 5 mm dia.×5 mm long, EVOH content 50%).

While the EVOH pellets thus obtained were fed to the top (topmost part) of a column reactor (7 m high, 1 m in dia.) at a rate of 0.6 m$^3$/hr, an aqueous solution (30° C.) containing 0.1% of acetic acid (B), 0.007% of boric acid (B) and 0.07% of sodium acetate (C) was fed to the bottom of the reactor at a rate of 4.7 m$^3$/hr. In the meantime, the excess of said aqueous solution was withdrawn from an upper part of the reactor (at a level corresponding to 1/10 of column height from the reactor top) and the treated EVOH pellets (water content 50%) was continuously withdrawn from the reactor bottom (lowest part of the column).

The EVOH (A') pellets treated as above were subjected to fluidized drying in a batch fluidized-bed dryer (column type) with nitrogen gas circulated at 75° C. (flow rate 2 m/sec) for about 3 hours to give EVOH (A') pellets with a water content of 20%. Then, using a batch box dryer (aeration type), the above EVOH pellets were further subjected to stationary drying with nitrogen gas at 125° C. (flow rate 0.3 m/sec) for about 18 hours to give dry EVOH (A') pellets with a water content of 0.3% [based on 100 weight parts of EVOH, 0.09 part of acetic acid (B), 0.09 part of boric acid (in terms of boron) and 0.08 part of sodium acetate (in terms of sodium)].

The EVOH (A') pellets recovered at 6 hours (a), 12 hours (b), 18 hours (c), 24 hours (d) and 48 hours (e) after the beginning of withdrawal were respectively dried in the same manner as above and evaluated as follows.

Fluidity

For each EVOH (A') sample recovered as above, the melt flow rate (MFR; unit: g/10 min) was measured using a melt indexer (Toyo Seiki) at a temperature of 210° C. under a load of 2160 g in accordance with JIS K 7210 (Flow Test of Thermoplastic Plastics, Method A (manual cutting method)).

The standard deviations of melt flow rate values of (a)~(e) were also investigated.

Resistance to Thermal Discoloration

Each EVOH obtained as above was allowed to stand in a hot oven (in atmospheric air) at 150° C. for 5 hours and the degree of discoloration (YI) was measured and the variation was evaluated as follows.

○—The YI value of (b)~(e) relative to (a) are within ±2.5% at all 4 levels.

Δ—The YI values of (b)~(e) relative to (a) are within ±2.5% at 3 levels and larger than ±2.5% at one level.

x—The YI values of (b)~(e) relative to (a) are within ±2.5% at 2 levels and larger than ±2.5% at 2 levels.

Each of the above samples (a)~(e) was fed to a single-screw extruder equipped with a T-die and a 40 μm-thick EVOH (A') film was prepared under the following conditions and evaluated as follows.

Film-Forming with a Single-Screw Extruder

| Screw in. dia. | 40 mm |
| --- | --- |
| L/D | 28 |
| Screw compression ratio | 3.2 |
| Screw speed, rpm | 60 rpm |
| T-die | Coat hanger type |
| Die width | 450 mm |
| Extrusion temperature | C1: 180° C., H: 230° C. |
| | C2: 220° C., D: 230° C. |
| | C3: 240° C., |
| | C4: 240° C. |

Melt-Moldability (1); Fish Eye

The film immediately after forming (10 cm×10 cm) was visually examined for fish eyes not less than 0.01 mm in diameter and evaluated according to the following criteria.

⊚—0~3 fish-eyes
○—4~10 fish-eyes
Δ—11~50 fish-eyes
x—51 or more fish-eyes

Melt-Moldability (2); Torque Change

The extruder motor load during film formation=screw torque A (in amperes) was measured and rated on the following scale.

○—The screw torque A values of (b)~(e) relative to (a) are less than ±5% at all 4 levels.

Δ—The screw torque A values of (b)~(e) relative to (a) are less than ±5% at 3 levels and not less than ±5% at 1 level.

x—The screw torque A values of (b)~(e) relative to (a) are less than ±5% at 2 levels and not less than ±5% at 2 levels.

Example 2

Except that, in addition to the aqueous solution of boric acid, 4 parts of a 0.1% aqueous solution of calcium acetate was added to the EVOH (A) solution and that calcium acetate was incorporated in the aqueous acetic acid/boric acid/sodium acetate solution to be fed from the reactor bottom at a final concentration of 0.002%, the procedure of Example 1 was otherwise repeated to continuously give EVOH (A') and evaluations were made in the same manner as above.

Example 3

Except that, in addition to the aqueous solution of boric acid, 2 parts of a 0.5% aqueous solution of calcium dihydrogen phosphate was added to the EVOH (A) solution and that calcium dihydrogen phosphate was incorporated in the aqueous acetic acid/boric acid/sodium acetate solution to be fed from the reactor bottom at a final concentration of 0.006%, the procedure of Example 1 was otherwise repeated to continuously give EVOH (A') and evaluations were made in the same manner as above.

Example 4

Except that, in addition to the aqueous solution of boric acid, 2 parts of a 0.5% aqueous solution of magnesium acetate was added to the EVOH (A) solution and that magnesium acetate was incorporated in the aqueous acetic acid/boric acid/sodium acetate solution to be fed from the reactor bottom at a final concentration of 0.006%, the procedure of Example 1 was otherwise repeated to continuously give EVOH (A') and evaluations were made in the same manner as above.

Example 5

Except that the amount of the 1% aqueous solution of boric acid added to the EVOH (A) solution was changed to 2 parts and that the concentration of boric acid in the aqueous acetic acid/boric acid/sodium acetate solution to be fed from the reactor bottom was adjusted to 0.0035%, the procedure of Example 1 was otherwise repeated to continuously give EVOH (A') and evaluations were made in the same manner as above.

Comparative Example 1

Except that the addition of a 1% aqueous solution of boric acid (B) to the EVOH (A) solution was omitted, the procedure of Example 1 was otherwise repeated to give EVOH pellets. The pellets were treated in the column reactor and dried in the same manner to give dry EVOH pellets. This product was evaluated in the same manner as above.

The results of evaluation in the above Examples and Comparative Example are summarized in Tables 1 and 2.

TABLE 1

| | Fluidity (MFR, g/10 min) | | | | | |
|---|---|---|---|---|---|---|
| | (a) | (b) | (c) | (d) | (e) | S.D. |
| Example 1 | 3.54 | 3.47 | 3.50 | 3.49 | 3.52 | 0.03 |
| Example 2 | 3.55 | 3.50 | 3.52 | 3.54 | 3.49 | 0.03 |
| Example 3 | 3.46 | 3.49 | 3.50 | 3.49 | 3.47 | 0.02 |
| Example 4 | 3.64 | 3.59 | 3.64 | 3.60 | 3.57 | 0.03 |
| Example 5 | 8.05 | 8.14 | 8.18 | 8.09 | 8.16 | 0.05 |
| Compar. Example 1 | 5.05 | 4.31 | 3.90 | 4.80 | 4.05 | 0.49 |

TABLE 2

| | Resistance to thermal discoloration | Melt-moldability | | | | | Torque change |
|---|---|---|---|---|---|---|---|
| | | Fish eye | | | | | |
| | | (a) | (b) | (c) | (d) | (e) | |
| Example 1 | ○ | ⊚ | ⊚ | ⊚ | ⊚ | ⊚ | ○ |
| Example 2 | ○ | ⊚ | ⊚ | ⊚ | ⊚ | ⊚ | ○ |
| Example 3 | ○ | ⊚ | ⊚ | ⊚ | ⊚ | ⊚ | ○ |
| Example 4 | ○ | ⊚ | ⊚ | ⊚ | ⊚ | ⊚ | ○ |
| Example 5 | ○ | ⊚ | ⊚ | ⊚ | ⊚ | ⊚ | ○ |
| Compar. Example 1 | Δ | ⊚ | ⊚ | ○ | Δ | Δ | X |

In accordance with the method of the invention, EVOH with good melt-moldability and reduced variations in characteristics (fluidity, resistance to thermal discoloration, etc.) can be produced continuously and on a steady basis and this EVOH is very useful for such applications as the film, sheet, tube, bag, cup, tray, bottle, tank, etc. for the packaging of food and drinks, cosmetic products, pharmaceutical preparations, detergents, aromatic products, industrial chemicals, agrochemicals, fuels and other products.

What is claimed is:

1. A method for continuous treatment of a saponified ethylene-vinyl acetate copolymer (A) with acid(s) (B) and/or salt(s) thereof (C) which comprises continuously feeding to a column reactor from the top a saponified ethylene-vinyl acetate copolymer (A') in pellet form, which contains incorporated therein the acid(s) (B) and/or salt(s) (C), wherein at least part of said acid(s) (B) and/or salt(s) (C) is a boric acid or its salt, simultaneously continuously feeding an aqueous solution of the acid(s) (B) and/or salt(s) (C), wherein at least part of said acid(s) (B) and/or salt(s) (C) is boric acid or its salt, from the bottom of the reactor to thereby effect a countercurrent contact of (A') with the aqueous solution of (B) and/or (C), continuously withdrawing the excess of the aqueous solution of acid(s) (B) and/or salt(s) (C) from the reactor top, and continuously withdrawing the treated saponified ethylene-vinyl acetate copolymer from the reactor bottom.

2. A method for continuous treatment of a saponified ethylene-vinyl acetate copolymer as claimed in claim 1 wherein the saponified ethylene-vinyl acetate copolymer (A') is in pellet form and that the saponified ethylene-vinyl acetate copolymer (A) content of the pellet is 20 to 80 weight %.

3. A method for continuous treatment of a saponified ethylene-vinyl acetate copolymer as claimed in claim 1 wherein the acid(s) (B) other than boric acid is at least one member selected from the group consisting of acetic acid and phosphoric acid.

4. A method for continuous treatment of a saponified ethylene-vinyl acetate copolymer as claimed in any of claim 1 wherein the boric acid salt is alkali metal or alkaline earth metal salt of boric acid and salt(s) (C) other than boric acid salt is at least one member selected from the group consisting of alkali metal or alkaline earth metal salts of acetic acid and phosphoric acid.

5. A method for continuous treatment of a saponified ethylene-vinyl acetate copolymer as claimed in any of claims 1 to 4 wherein the saponified ethylene-vinyl acetate copolymer (A') is comprised of pellets obtained by incorporating the acid(s) (B) and/or salt (C) in a solution of the saponified ethylene-vinyl acetate copolymer (A), extruding the same in a coagulation bath, and cutting the coagulated extrudate.

6. A method for continuous treatment of a saponified ethylene-vinyl acetate copolymer as claimed in claim 5 wherein the saponified ethylene-vinyl acetate copolymer (A) content of said solution of saponified ethylene-vinyl acetate copolymer (A') is 2 to 70 weight %.

* * * * *